Figure 1:
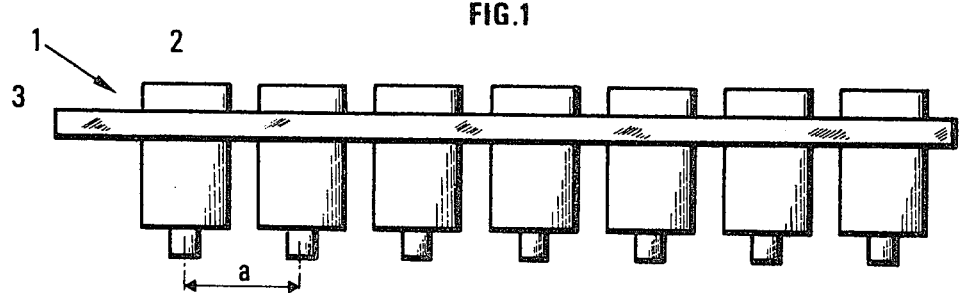

United States Patent [19]

Delignieres

[11] 4,105,991
[45] Aug. 8, 1978

[54] ACOUSTIC WAVE TRANSMITTER-RECEIVER

[75] Inventor: Robert Delignieres, Mareil Marly, France

[73] Assignee: Institut Francais du Petrole, France

[21] Appl. No.: 699,331

[22] Filed: Jun. 24, 1976

[30] Foreign Application Priority Data

Jul. 7, 1975 [FR] France ................................ 75 21495

[51] Int. Cl.² ........................... G01S 9/66; H04R 1/40
[52] U.S. Cl. ......................................... 340/3 D; 340/9
[58] Field of Search .......................... 340/3 D, 8 R, 9; 343/100 LE

[56] References Cited

U.S. PATENT DOCUMENTS

| | | | |
|---|---|---|---|
| 3,691,513 | 9/1972 | Stedtnitz | 340/3 D |
| 3,781,774 | 12/1973 | Delignieres | 340/3 D |

Primary Examiner—Richard A. Farley
Attorney, Agent, or Firm—Craig & Antonelli

[57] ABSTRACT

Acoustic wave transmitter-receiver comprising at least one pair of transducer assemblies arranged symmetrically with respect to a vertical axis, the transducers of each assembly being lined up with a regular spacing such that the projection length thereof on the vertical axis is equal to a whole number of wave lengths of the transmitted acoustic waves, means for generating transmission signals and means for transmitting the latter, in phase opposition, to the two transducer assemblies of said pair.

8 Claims, 8 Drawing Figures

ACOUSTIC WAVE TRANSMITTER-RECEIVER

This invention relates to an acoustic wave transmitter-receiver particularly useful in a Doppler navigation system.

The vehicles provided with a Doppler navigation system comprise transducer means whose main transmission axes are oriented along at least one direction inclined with respect to a vertical line and preferably along directions parallel to the edge-lines of a pyramid whose apex is on the vehicle.

Recurrent acoustic pulses are transmitted through transducer means. The echoes of the pulses reflected by a reference surface, with respect to which is determined the vehicle displacement, are sensed by transmitting transducers or other transducers.

The Doppler frequency shift is used to determine the speed of displacement and the travelled distance.

Each transducing means comprises one or more pressure transducers whose transmission direction diagram comprises a central lobe, the axis of which defines the main transmission direction and lateral or secondary lobes. Acoustic energy is also transmitted and received along the direction of each axis of the lateral lobes. The inclination of the axes of the secondary lobes is different from that of the axis of the main lobe. As a result, the Doppler frequency shifts to which are subjected the acoustic signals received in the main lobe and in the secondary lobes are different and the frequency spectrum of the signals received is enlarged. The measured value of the central frequency of the frequency spectrum of the received signals is subject to a systematic error due to the unsymmetry of the spectrum, resulting in an inaccuracy of the determination of the vehicle velocity and of the distance it travels.

The invention has for object a sensor device whose arrangement and method of use make it possible to avoid the above-mentioned drawbacks. The device comprises at least one pair of transducer assemblies for transmitting and receiving acoustic waves, the transducers of each assembly being regularly spaced and oriented in a direction parallel to a given axis. The axes of both assemblies are arranged symmetrically with respect to a vertical line. The device also includes means for generating transmission signals.

The device is remarkable in that the spacing between the transducers of each assembly is so selected that the length of the projection of said spacing on a vertical line is equal to a whole number of wave lengths of the transmitted acoustic waves.

In addition, it comprises means for transmitting the transmission signals to both transducer assemblies, in phase opposition.

Figure 2:
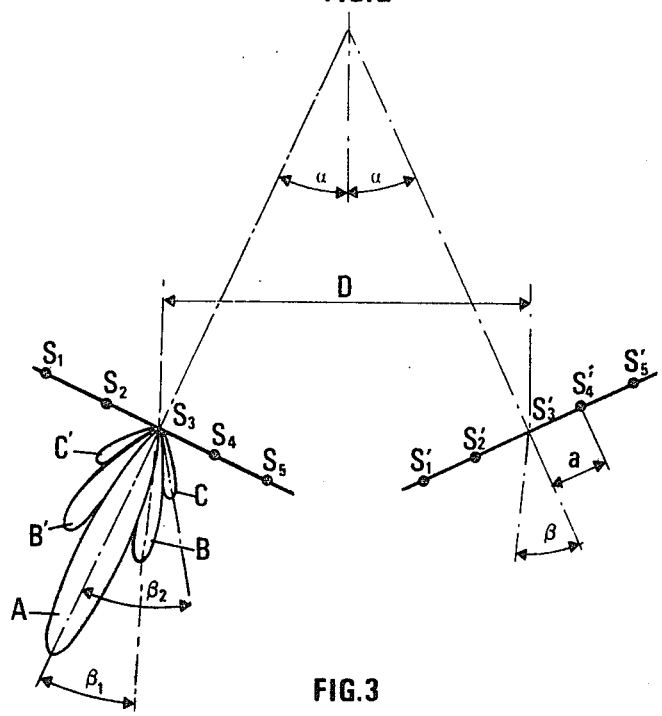
Figure 3:
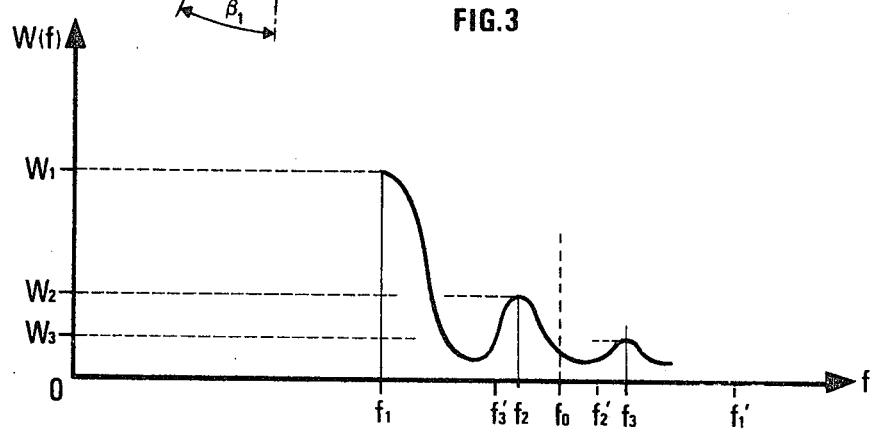
Figure 4:
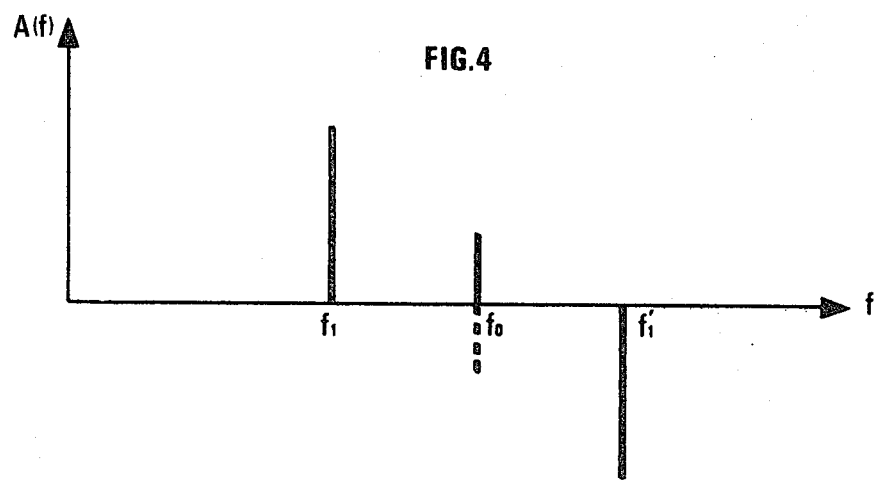
Figure 5:
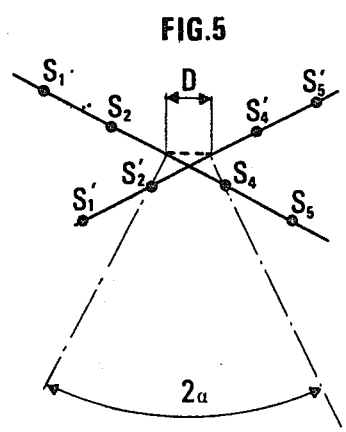
Figure 7:
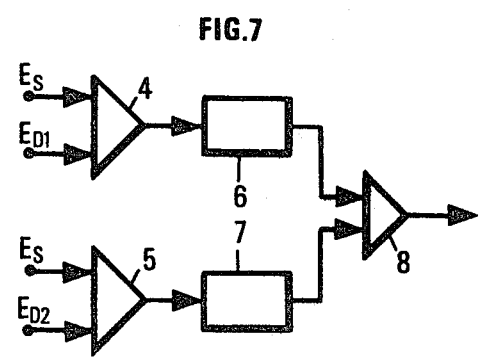
Figure 6:
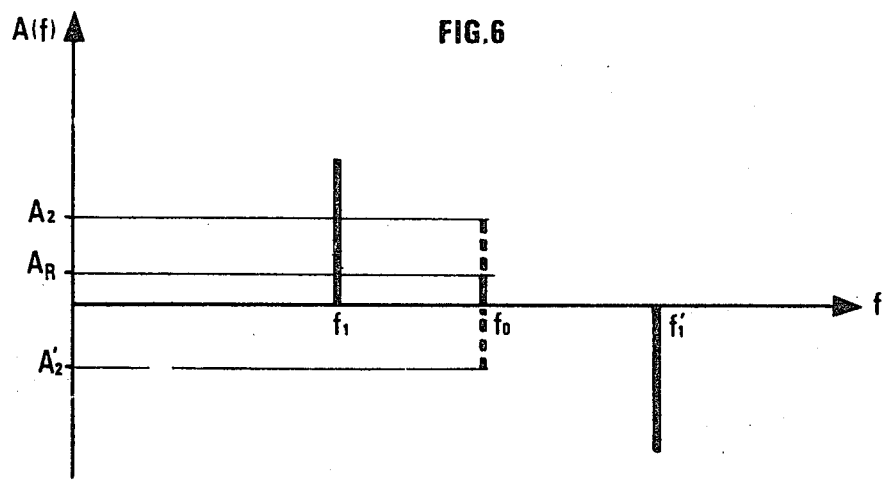
Figure 8:
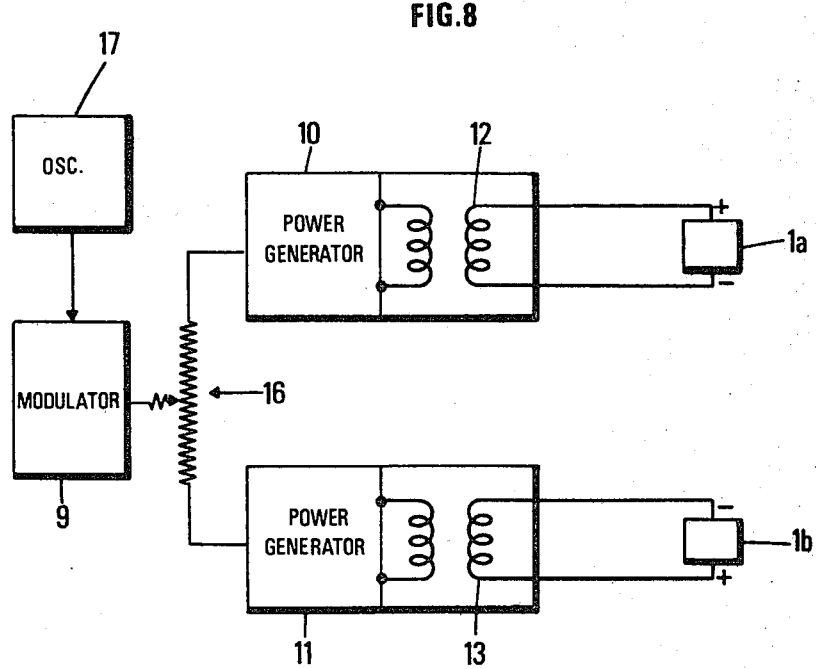

Other characteristics and advantages of the device will be made apparent from the description of a non-limitative embodiment of the invention, given with reference to the accompanying drawings wherein:

FIG. 1 diagrammatically shows a transducer assembly or network;

FIG. 2 diagrammatically shows the position of the two networks with respect to a vertical axis;

FIG. 3 diagrammatically shows the envelope curve of the frequency spectrum of the received acoustic signals;

FIG. 4 diagrammatically shows the position of the main "lines" of the frequency spectrum in the case where both transducer assemblies transmit signals in phase opposition and are balanced;

FIG. 5 diagrammatically shows the arrangement of two transducer assemblies for small shifts;

FIG. 6 diagrammatically shows the position of the main "lines" of the frequency spectrum in the case where both transducer assemblies transmit signals in phase opposition and are unbalanced; and FIG. 7 diagrammatically shows elements for combining signals generated by a compensating sensor with the received signals, and FIG. 8 diagrammatically shows the elements for generating, transmitting, and balancing the signals supplied to the transducer assemblies.

The sensor assembly shown in FIG. 1 comprises a network 1 of transducers whose axes are parallel.

Transducers 2 are placed at regular intervals $a$ on a frame 3 which may be secured to a vehicle. The network may also be two-dimensional i.e. the transducers may be arranged on the whole surface of a rectangular frame.

Two networks, each comprising for example five transducers, diagrammatically shown on FIG. 2 as source-points $S_1, S_2 \ldots S_5$ and $S'_1, S'_2 \ldots S'_5$, are secured onto the vehicle.

The main transmission axes of the transducers, i.e. their symmetrical axes, are at an angle $\alpha$ with respect to a vertical line.

The amplitude of the acoustic waves transmitted by the network in a direction at an angle $\beta$ with respect to the transmission axes of the transducers, is given by the well-known relationship:

$$A(\beta) = \frac{k}{n} \cdot \frac{\sin(\frac{2\pi a n}{\lambda} \sin \beta)}{\sin(\frac{2\pi a}{\lambda} \sin \beta)}$$

wherein:

$\lambda$ is the wave length of the transmitted acoustic waves, $a$ is the common distance between the transducers, and $k$ is a proportionality coefficient, and $n$ is the number of transducers.

The direction diagram of the networks corresponding to relationship (1) comprises a main transmission lobe A whose axis is the main transmission axis and lateral lobes B,B', C,C' etc . . . symmetrically oriented with respect to the main transmission axis and having successive amplitude maxima decreasing rapidly along directions $\beta_1, \beta_2$ etc . . .

Let $f_o$ be the frequency of the transmitted acoustic waves. The frequency of the echoes of the transmitted waves on the reference surface is not the same when the acoustic energy is transmitted in the main transmission lobe or in the lateral lobes.

In the case of a network inclined with respect to a vertical line in a direction opposite to the moving direction of the vehicle, the frequencies of the echoes of the signals transmitted along the axes of the main lobe A and of the lateral lobes B, C, located between the main transmission axis and the vertical axis, are respectively $f_1, f_2, f_3$ etc . . . The frequency $f_3$ is higher than $f_o$ when the projection of the axes of lobe C on the horizontal line is oriented in the direction of movement.

The envelope W(f) of the frequency spectrum of the echoes of the transmitted signals (FIG. 3) comprises relative maximum values $W_2$ and $W_3$ respectively corresponding to frequencies $f_2$ and $f_3$.

The frequency spectrum of the echoes of the acoustic signals transmitted from the network arranged symmetrically with respect to a vertical line, is symmetrical with respect to frequency $f_o$ and comprises relative frequency maxima $f'_1, f'_2, f'_3$ etc ...

As the received acoustic energy decreases with the propagation time and, accordingly, with the inclination of the transmission axes with respect to a vertical line, the echoes of the signals transmitted from the lateral lobes B' and C' are substantially weaker than those corresponding to lobes B and C and the envelope of the frequency spectrum will not be symmetrical.

The envelope will have a greater amplitude for the frequencies within the range from $f_o$ to $f_1$. It results that the Doppler measurement corresponding to the values of the function:

$$F = \frac{\int_0^\infty f^2 W(f) \, df}{\int_0^\infty W(f) \, df} \qquad (2)$$

will be disturbed by the presence of relative maximum values $f_2$ and $f_3$ particularly; the result of the measurement limited to the effect of $f_1$ and $f_2$ is substantially disturbed by the relative amplitude of the two lines.

In order to nullify the effects of the secondary lobes, the method of the invention consists of:

in a first step bringing the first secondary lobe $f_2$ along a vertical direction so as to make the frequency of the echoes of the transmitted signals in said lobe independent from the vehicle velocity.

In order to obtain this result, the spacing between the transducers is so selected that the first lateral maximum of relationship (1) occurs for a value of $\beta$ equal to $\alpha$, i.e. when:

$$a \sin \alpha = n \lambda \qquad (3)$$

n being a positive integer
The spacing $a$ is selected equal to $$\frac{n \lambda}{\sin \alpha}.$$

In practice the angle $\alpha$ will be preferably selected equal to 30° and the spacing between the transducers is proportional to twice the transmission wave length;

in a second step, reducing as much as possible the amplitude of the "line" not involved in the Doppler effect, i.e. the energy transmitted along a vertical direction. The "line" $f_o$ will disappear in the received echo when said energy is nullified.

The amplitude A' of the acoustic signals transmitted from each of the networks along a direction inclined at an angle $\alpha$ with respect to the vertical axis and received at a distance $r$ from the network, is:

$$A'(\beta,r) = (k \, I_o/r^b) A^2(\beta) \exp - 2 \, ar \qquad (4)$$

A being defined as in relationship (1)

$k$, $I_o$, $b$ and $a$ being respectively the coefficient of reflection on the reference surface, the sound intensity transmitted in the direction thereof, a coefficient ranging from 2 to 4 and an absorption coefficient.

The resulting amplitude transmitted from the two networks along a direction perpendicular to the reference surface and received at a distance $r$ may be written:

$$A'(\beta,r) = (k/r^b) \exp - 2 \, ar \, [I_1 A_1^2(\beta) + I_2 A_2^2(\beta)]$$

$I_1$ and $I_2$ being the intensities respectively transmitted from the two networks.

In order to cancel "line" $f_o$, the method of the invention consists of using networks symmetrical with respect to the vertical axis, whose first lateral lobes are equivalent, and controlling these networks of transducers so that they transmit signals in phase opposition (FIG. 4). A dephaser will be incorporated to the transmission device.

When the two networks are operated in phase opposition, it may happen that the energy transmitted along certain directions and, in particular, along the directions of the main transmission axes, be of reduced level.

In order to avoid this drawback, the distance D between the centers of the networks is so selected as to result in a phase combination of the acoustic signals transmitted along the main transmission axes, so that the following relationship be complied with:

$$D \sin \alpha = (2m + 1) \lambda/2 \qquad (5)$$

$m$ being an integer.

When angle $\alpha$ is chosen equal to 30°, D is chosen equal to $(2m + 1)$.

The two networks of transducers fed in phase opposition and spaced at a distance D will produce interferences. However, when number $m$ is naught, i.e. when D is equal to $\lambda$, no useful interference occurs between the signals except along directions parallel to the axes of the main lobes of the two transducer networks. Along directions close to the vertical axis, the signals transmitted from the two networks are in phase opposition.

When the amplitude of the acoustic signals transmitted within the two secondary lobes oriented along the vertical axis are not identical, it suffices, in the case where D is equal to $\lambda$, to associate to the transmitting device a device for balancing the amplitude so as to nullify the acoustic energy received along the vertical axis.

When number m is different from O, there may exist directions close to a vertical line and included in the transmission-reception angle of the two secondary lobes of vertical axes, for which the acoustic signals transmitted from the two networks usefully interfere and the compensation is only partial (FIG. 6). It is then possible to obtain the extinction of the signals received along the vertical direction by means of a simple balancing device.

In order to obtain a nullification there is used an additional very directional compensation sensor whose reception axis is vertical. Its reception angle must at most be equal to $2\alpha$. It may consist of a linear network preferably comprising an even number of transducers. The network is placed vertically under the vehicle. The spacing $d$ between the transducers of this network is so selected that the direction diagram shows a maximum along the vertical line and a minimum along directions close to the main transmission directions of the two networks. Both conditions result in the following relationships:

$$d = q \lambda \qquad (6)$$

$$d \cos \beta = (2p + 1)\lambda/2 \qquad (7)$$

$p$ and $q$ being integers.

There can be deduced, consequently:

$$\cos \beta = \frac{2p + 1}{2q} \qquad (8)$$

The values of $p$ and $q$ are so selected that angle $\beta$ is close to angle $\alpha$. In the case where $\alpha$ is equal to 30°, there can be selected for example:

$$p = 3 \text{ and } q = 4$$

The network senses the acoustic signals Es arriving in the vicinity of the vertical axis and resulting from interferences.

For obtaining a nullification of signals Es in the receiving device, these signals are respectively added to the Doppler signals $E_{D1}$ and $E_{D2}$ received in the main lobes, in summing devices 4 and 5 (FIG. 7). The signals delivered by these summing devices are treated in measuring devices 6, 7, of a known type, determining the distance travelled by the vehicle in relation with the Doppler frequency shift having an effect upon the acoustic signals received by each of the networks and then added in a summing device 8.

The transmission, reception and measuring devices may advantageously by selected of the type described in the U.S. Pat. No. 3,781,774. Thus, as shown in FIG. 8, the system for generating transmission signals includes an oscillator 17 providing a transmission signal to a modulator 9 which controls two power generators 10 and 11 through a balance member 16 comprising a potentiometer, for example. The power generators are connected with the transducer assemblies 1a and 1b through two transformers 12 and 13 respectively. In order to feed the transmission signals in phase opposition, the connection of transducer assemblies 1a and 1b with the secondary windings of their respective transformers 12 and 13 are reversed with respect to each other.

What is claimed is:

1. An acoustic wave transmitter-receiver device comprising at least one pair of transducer assemblies for transmitting and receiving acoustic waves, the transducers of each assembly being regularly spaced and having their main transmission axes oriented in a direction parallel to a common axis, and the common axes of the two assemblies being arranged symmetrically with respect to a vertical axis, the spacing between the transducers of each assembly being so selected that the projection length of said spacing on the vertical axis is equal to a whole number of wave lengths of the transmitted acoustic waves, means for generating transmission signals, and means for transmitting said transmission signals, in phase opposition, to the two transducer assemblies.

2. An acoustic wave transmitter-receiver device comprising at least one pair of transducer assemblies for transmitting and receiving acoustic waves, the transducers of each assembly being regularly spaced and having their main transmission axes oriented in a direction parallel to a common axis, and the common axes of the two assemblies being arranged symmetrically with respect to a vertical axis, the spacing between the transducers of each assembly being so selected that the length of the projection of said spacing on the vertical axis is equal to a whole number of wave lengths of the transmitted acoustic waves and the central portions of said transducer assemblies being spaced from each other at a distance whose projection length on each of said common axes is equal to an odd number of half-wave lengths of the transmitted acoustic waves, means for generating transmission signals, and means for transmitting said transmission signals, in phase opposition, to the two transducer assemblies.

3. A transmitter-receiver device according to claim 2, comprising a member for balancing the transmission signals transmitted to the transducer assemblies when the projection length of the spacing between the central portion of the transducer assemblies on each of said axes is equal to a half-wave length of the transmitted acoustic waves.

4. A transmitter-receiver device according to claim 2, comprising a directional compensating transducer assembly oriented along a vertical direction and means for summing up the signals received by the compensating transducer assembly and the signals respectively received by the two transducer assemblies.

5. A transmitter-receiver device according to claim 4, wherein the compensating transducer assembly comprises a plurality of transducers whose spacing is selected substantially equal to a whole number of wave lengths of the transmitted acoustic waves.

6. A transmitter-receiver device according to claim 5, wherein the compensating transducer assembly has a directional diagram showing a main lobe which has a minimum along directions close to those of the axes.

7. A transmitter-receiver device according to claim 6, wherein the projection length of the spacing between the transducers of the compensating transducer assembly in a direction substantially parallel to the axes is selected equal to an odd whole number of half-wave lengths of the transmitted acoustic waves.

8. A transmitter-receiver device according to claim 4, wherein said compensating transducer assembly comprises an even number of transducers.

* * * * *